United States Patent
Fleischer, deceased

[15] 3,659,807
[45] May 2, 1972

[54] BRAKE ATTACHMENT FOR STAR DRAG TYPE FISHING REELS

[72] Inventor: Oscar Fleischer, deceased, late of 2610 South West 21st Street, Miami, Fla. 33145 by Helen Krohn Fleischer, executrix

[22] Filed: May 1, 1970

[21] Appl. No.: 33,836

[52] U.S. Cl. ............................................. 242/219
[51] Int. Cl. ........................................... A01k 89/02
[58] Field of Search .................. 242/217, 218, 219, 220, 211, 242/212, 84.5 R, 84.51 R, 99

[56] References Cited

UNITED STATES PATENTS

| | | | |
|---|---|---|---|
| 2,129,386 | 9/1938 | Schafer | 242/221 X |
| 1,731,208 | 10/1929 | Adams | 242/84.5 R |
| 2,146,582 | 2/1939 | Kohlhepp | 242/219 |
| 2,198,257 | 4/1940 | McMahon | 242/221 |
| 3,166,269 | 1/1965 | Veroli | 242/217 |

Primary Examiner—Billy S. Taylor
Attorney—Salvatore G. Militana

[57] ABSTRACT

An improved brake attachment for conventional star drag type fishing reels wherein the attachment may be incorporated in the original assembly thereof or as a replacement of a greater number of parts forming the conventional brake mechanism, the attachment consisting of four parts, namely, a drive disk to be rotatably mounted on the conventional drive shaft and positioned within the recess of the conventional driving gear so as to rotate in unison with the driving gear, a brake disk rotatably mounted on the drive shaft and secured to also rotate in unison with the driving gear, and a brake shoe slidably mounted on the drive shaft adjacent the brake disk with a brake member interposed between the drive disk and the brake shoe whereby upon actuation of the star wheel the frictional engagement of the brake shoe and brake disk may be adjusted to provide the desired drag.

4 Claims, 4 Drawing Figures

Patented May 2, 1972 3,659,807
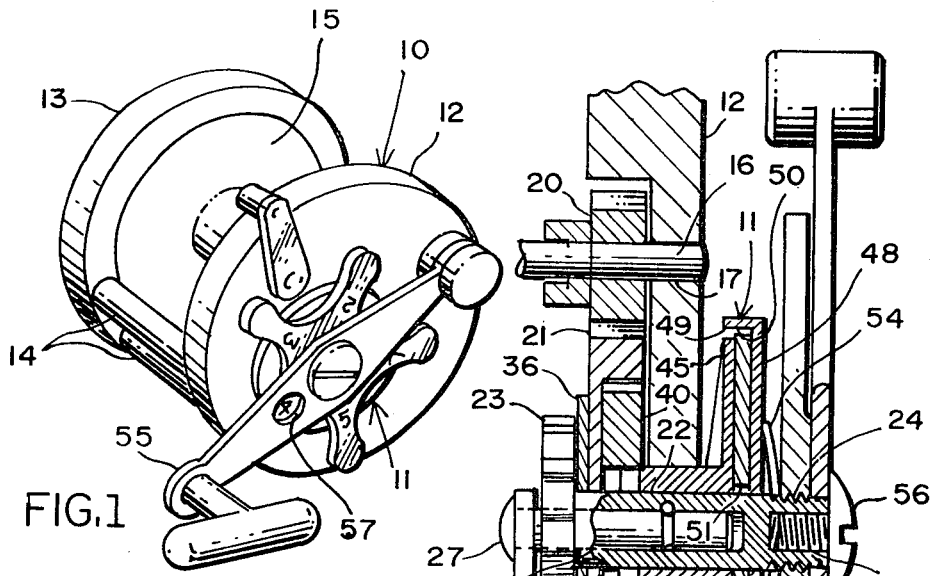
FIG.1
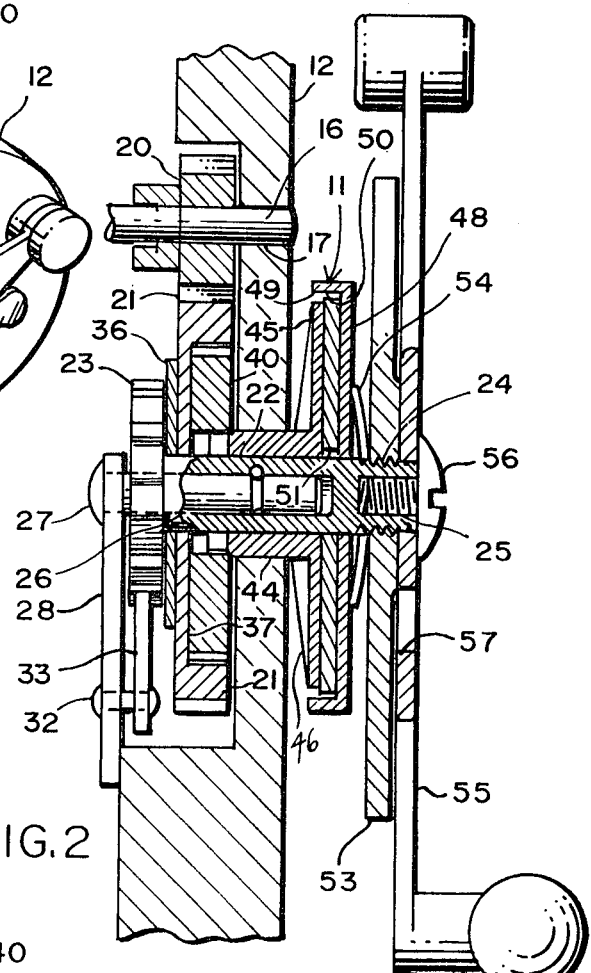
FIG.2
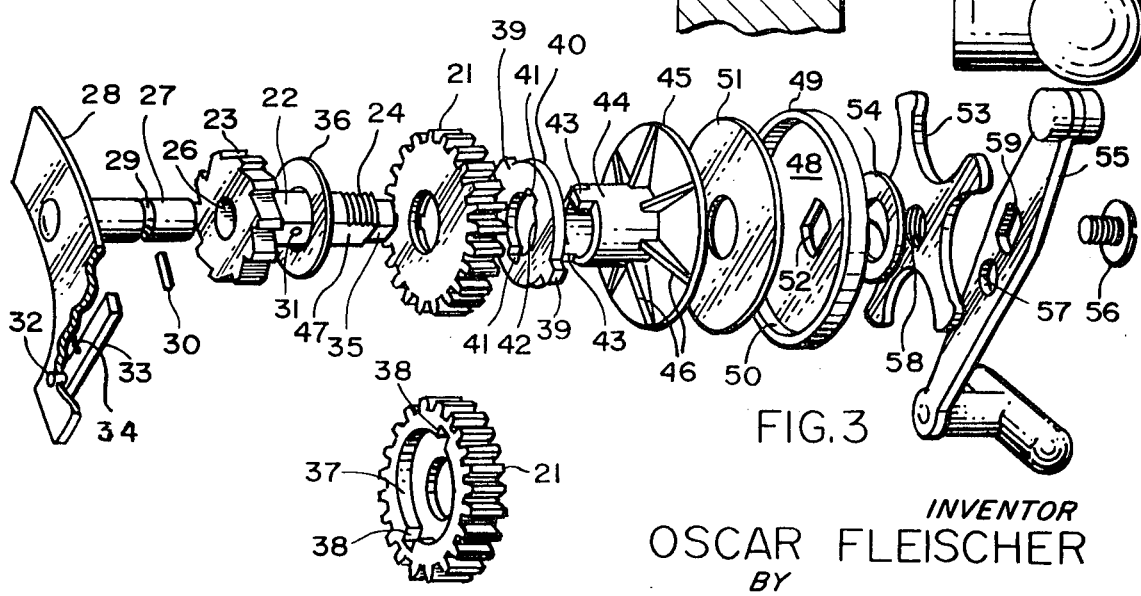
FIG.3
FIG.4
INVENTOR
OSCAR FLEISCHER
BY
Salvatore G. Militana
ATTORNEY

BRAKE ATTACHMENT FOR STAR DRAG TYPE FISHING REELS

This invention relates to fishing reels and is more particularly directed to a brake attachment for star drag fishing reels.

In the conventional star drag fishing reels the disks that produce the braking effect are positioned within a recess formed in the driving gear. Since this recess is relatively very small both in diameter and in depth, the brake disks will of necessity be very thin with very little braking surfaces thereon. Consequently these disks have to be replaced often if subjected to normal use. When using the reel for large fish, the heat created by the frictional engagement of the disks does not dissipate properly but instead causes the disks to expand and may even cause them to disintegrate. During the expansion of the disks the braking effect does not remain constant, so that the operator of the reel must make a change to the adjustment of the star wheel to maintain the originally selected amount of drag or braking effect. In order to service the brake mechanism or replace the disks in the star drag type reel, virtually the entire reel has to be dismantled since the gear, within which the disks of the brake is found, is not accessible. Also, the brake disks are not protected against the infiltration of water, salt and other foreign matter requiring repeated and frequent servicing of the brake mechanism in order to keep it in working condition.

The present invention contemplates avoiding all of the above indicated disadvantages of the conventional brake mechanism in the star drag type reels by providing an improved brake attachment that is readily substituted in the conventional reel for certain of the parts.

Therefore, it is a principal object of the present invention to provide a brake attachment or kit that an ordinary person of normal skill with use of a screw driver alone can substitute for certain of the brake mechanism found in the conventional star drag type reels, thereby providing greater brake control and power and smoother action than the conventional brake.

Another object of the present invention is to provide a brake attachment for star drag fishing reels which attachment consists of a lesser number of parts than in the conventional brake mechanism resulting in a decreased cost of production and assembly.

A further object of the present invention is to provide a brake mechanism for star drag fishing reels including a large diametered brake disk and brake shoe, a star wheel operating with indicators such as numerals and the like positioned to designate braking power with a window viewer in the handle whereby a smooth and constant braking effect is attained for certain indicated positions of the star wheel.

A still further object of the present invention is to provide a brake attachment that can be originally incorporated in a star wheel fishing reel, or used as a kit to replace the conventional brake mechanism, thereby providing a watertight attachment in lieu of the present conventional brake mechanism which permits water and foreign matter to enter therein.

With these and other objects in view, the invention will best be understood from a consideration of the following detailed description taken in connection with the accompanying drawing forming a part of this specification, with the understanding, however, that the invention is not confined to any strict conformity with the showing of the drawings but may be changed or modified so long as such changes or modifications mark no material departure from the salient features of the invention as expressed in the appended claims.

FIG. 1 is a prospective view of a conventional fishing reel with the brake attachment applied.

FIG. 2 is a cross-sectional view taken along the center axis of the brake attachment.

FIG. 3 is an exploded view of the brake attachment.

FIG. 4 is a prospective view of the driving gear of the reel.

Referring to the drawing wherein like numerals are used to designate similar parts throughout the several views, the numeral 10 refers to a conventional fishing reel upon which my attachment 11 has been mounted consisting of end plates 12 and 13 mounted in spaced relation by cross members 14. Rotatably mounted on the end plates is a spool 15 having a shaft 16 received in bores 17 at the axes of the end plates 12 and 13. Mounted to rotate in unison with the spool shaft 16 is a gear 20 that is in mesh engagement with a driving gear 21 rotatably mounted on a shaft 22. The shaft 22 which has a ratchet wheel 23 mounted at its inner end and extends through the end plate 12 terminating in a threaded portion 24 and a threaded recess 25. The shaft 22 is provided also with an elongated recess or blind bore 26 extending from the inner end thereof in which a pin 27 extends. The inner end of the pin 27 is fastened to a support plate 28 that is fastened to the inner surface of the end plate 12. The pin 27 is provided with a peripheral groove 29 in which a keeper 30 extending through a bore 31 in the shaft 22 into the peripheral groove 28 permitting the shaft 22 to rotate on the pin 27 but prevent any translitory movement thereon. Pivoted to the support plate 28 as at 32 is a pawl 33 biased by a spring 34 to engage the ratchet wheel 23 and permit a rotation of the shaft 22 in one direction only. A washer or friction disk 36 is positioned between the ratchet wheel 23 and driving gear 21.

The driving gear 21 is provided with a centrally disposed recess 37 at whose periphery are slotted portions 38 that receive lugs 39 mounted on the outer periphery of a disk 40 positioned within the recess 37. The disk 40 is provided with a central bore 42 and slots 41 at the periphery thereof. The slots 41 receive lugs 43 positioned on the end of a sleeve 44 having a brake disk 45 secured at the free end thereof and rotatably mounted on the shaft 22. The exposed surface of the brake disk 45 is provided with radially mounted fins 46 for dissipating heat generated by braking effect, as is explained in greater detail hereinafter.

It is to be noted that the shaft 22 is approximately cylindrical having however, flattened side portions 47 in order that certain members mounted thereon may rotate and others not rotate but be slidably mounted thereon as indicated hereinafter. For example, at all times when the spool 15 is rotating, the spur gear 20, drive gear 21, disk 40, sleeve 44 and brake disk 45 will rotate in unison therewith. However, mounted on the shaft 22 is a brake shoe consisting of a disk 48 at whose periphery is a flange 49 forming a recess 50 for receiving a brake member 51 and the brake disk 45 as best shown by FIG. 2. The brake shoe 48 is provided with a non-circular bore 52 so that the brake shoe 48 may not rotate about the shaft 22 but can only slide longitudinally along the shaft 22.

Threadedly mounted as by threads 58 on the threads 24 of the shaft 22 is a star wheel 53 held frictionally thereon by a spring washer 54 interposed between the brake shoe 48 and the star wheel 53. Mounted on the square end 35 of the shaft 22 is a crank or operating handle 55 having a square opening 59 secured to the shaft end 35 by a bolt 56. The crank 55 is provided with an opening 57 so as to view indicators such as numerals and the like found on the star wheel 53. When the star wheel 53 is rotated about the shaft 22 on the threads 24, the star wheel 53 will move on the shaft 22 against the spring washer 54 in the direction of the brake shoe 48 or in the opposite direction. When the star wheel 53 is rotated so as to move away from the spring washer 54, the frictional engagement of the brake disk 45 and brake shoe 48 will be at a minimum and one of the indicators on the star wheel 53 will be viewable through the opening 57 on the operating arm 55. Now as the star wheel 53 is rotated to move in the direction of the spring washer 54, the frictional engagement of the brake disk 45 and brake shoe 48 is progressively increased. This brake effect is known as drag. The fisherman will be able to correlate the position of the star wheel and the desired drag by use of the indicator on the star wheel as viewed through the opening 57 in the operating arm 55.

As stated hereinabove when the reel or spool 15 rotates by virtue of the action of a fish, for example, pulling on the fishing line that is wound on the spool 15, the gears 20 and 21 will rotate as well as the disk 40, sleeve 44 and brake disk 45. The pawl 33 prevents the ratchet wheel 23, shaft 22 and crank arm 55 from rotating in direction of rotation of the spool 15 that unwinds the fishing line therefrom. When the crank arm 55 is rotated in the only direction it can rotate, namely in the direction to wind the fishing line on the spool 15, the shaft 22, star wheel 53, brake shoe 48 will always rotate along with the ratchet wheel 23. It is seen that the brake disk 45 will rotate only when the spool 15 rotates while the brake shoe 48 rotates only when the operating handle 55 is rotated. The brake member 51 which is described as being free floating hereinabove, may be cemented or otherwise fastened to either member 45 or 48 if desired, the braking effect being the same in any situation.

When there is no effective frictional engagement of the brake shoe 48 and brake disk 45, the spool 15 will rotate readily, with little force required to rotate it in the direction to unwind fishing line from the spool while rotation of the operating member 55 will have no effect on the rotation of the spool 15. When there is a maximum frictional engagement of the brake shoe 48 and brake disk 45, rotation of the operating handle 55 will cause the direct rotation of the spool 15 in the direction of winding the fishing line on the spool 15 while force applied on the spool 15 cannot cause the rotation of the spool 15 in the direction of unwinding the fishing line therefrom.

When a person is fishing, he will first set the drag at zero or minimum by rotating the star wheel 53 so that it moves the maximum distance possible in a direction away from the spring washer 54 and there being no frictional engagement between the brake disk 45 and brake shoe 48. He will then permit the fishing line to unwind off the spool 15 as by casting or letting the line out in trolling. After a desired amount of fishing line has been let out into the water, he sets the drag by rotating the star wheel 53 in the direction of the spring washer 54 placing the brake disk 45 and brake shoe 48 in frictional engagement to the proper degree that results in the desired amount of drag as indicated by the indicator on the star wheel 53 viewable through the opening 57 in the operating handle 55. When a fish is caught, the person commences to bring it in by operating the crank arm 55 to wind the fishing line on the spool 15. When the pulling force of the fish is less than the drag, the spool 15 will rotate to wind the fishing line thereon. However, when the fish pulls with a greater force than the drag as affected by the frictional engagement of the brake disk 45 and brake shoe 48, the spool 15 will rotate in a reverse direction to permit the fishing line to unwind from the spool 15 and thereby prevent the fishing line from being subjected to a force beyond its breaking strength.

The attachment 11 to the star drag type fishing reel 10 which constitutes the invention herein, consists of the following parts: the drive disk 40, the brake disk 45 with its sleeve 44, the brake shoe 48, 49, and the brake member 51, the remainder of the structure shown and described hereinabove is conventional. In other words, a person desiring to utilize the present invention on a conventional star drag reel purchases a kit containing the four parts 40, 45 and 48 and 51. He then removes all of the parts that are on the shaft 22 exterior of the end plate 12 so as to expose the driving gear 21 with its recess 37 emptied of a plurality of conventional thin brake disks that are normally found therein. All that need be done is to insert the drive disk 40 in the recess 37 with the lugs 39 received by the slots 38; slide the sleeve 44 and brake disk 45 on the shaft 22 until the lugs 43 on the sleeve 44 are fitted into the slots 41; then slide the brake member 51 and brake shoe 48, on the shaft 22 until the flange 49 enshrouds the brake disk 45. The remainder of the structure which is conventional is then placed on the shaft 22 as described hereinabove.

What I desire to secure by Letters Patent of the United States is:

1. In a star wheel type fishing reel having a rotatable drive shaft threaded at one end portion, ratchet means permitting rotation of said drive shaft in only one direction, a driving gear operatively connected to a spool and rotatively mounted on said drive shaft, said driving gear having an axially disposed recess, a star wheel threadedly mounted on said end portion of said drive shaft, an operating member secured to said one end portion of said drive shaft for rotating said drive shaft in said one direction, a brake disk and a sleeve secured thereto rotatably mounted on said drive shaft, said sleeve extending in the direction of said recess of said driving gear, a further disk member rotatably mounted on said drive shaft in said recess and secured to said driving gear for unitary rotational movement therewith, means securing said sleeve and said further disk member for unitary rotational movement therewith, brake shoe means slidably and non-rotatably mounted on said drive shaft adjacent said brake disk and in proximity of said star wheel whereby upon the threading of said star wheel on said drive shaft, said brake shoe means is compelled to slide laterally on said drive shaft into frictional engagement with said brake disk for effecting drag on said spool.

2. The structure as recited by claim 1 wherein said brake shoe means comprises a third disk member, a flange mounted about the periphery of said third disk member and brake material interposed between said brake disk and said third disk member, said flange enshrouding said brake material and said first named disk member and spring washer means mounted on said drive shaft between said third disk member and said star wheel.

3. The structure as recited by claim 2 wherein said means securing said sleeve and said further disk member comprises slots formed on said further disk member and lug portions mounted on said sleeve received in said slots.

4. The structure as recited by claim 3 wherein indicator markings are positioned on said star wheel and said operating member having an opening aligned with said markings for viewing said marking to indicate the rotational position of said star wheel with relation to said operating arm and the amount of drag imposed thereby on said spool.

* * * * *